United States Patent [19]
Mathis

[11] 3,866,577
[45] Feb. 18, 1975

[54] PREFABRICATED ANIMAL HOUSE

[76] Inventor: Harold J. Mathis, 31 Adler Circle, Galveston, Tex. 77550

[22] Filed: May 18, 1973

[21] Appl. No.: 361,635

[52] U.S. Cl. .................................................. 119/19
[51] Int. Cl. .............................................. A01k 01/02
[58] Field of Search ............. 119/19; 46/11, 12, 16, 46/19, 21, 23, 30, 31; 35/16; 52/586, 753 R, 753 C, 753 D, 753 Y, 753 E, 753 K, 753 T

[56] References Cited
UNITED STATES PATENTS
| | | | |
|---|---|---|---|
| 1,258,788 | 3/1918 | Koch | 46/21 |
| 1,608,273 | 11/1926 | Glasgow | 46/19 X |

Primary Examiner—Hugh R. Chamblee
Attorney, Agent, or Firm—Pravel, Wilson & Matthews

[57] ABSTRACT

A prefabricated animal enclosure for dogs or the like including first and second side walls having spaced corner lugs at the end thereof which interconnect with front and rear walls also having spaced corner lugs at the ends thereof; a floor and roof being mounted with the side walls and front and rear walls and lock pin means for extending through the corner lugs, the floor and the roof or roof lugs in order to interconnect said side walls, front and rear walls, floor and roof to form a unitary animal enclosure.

12 Claims, 9 Drawing Figures

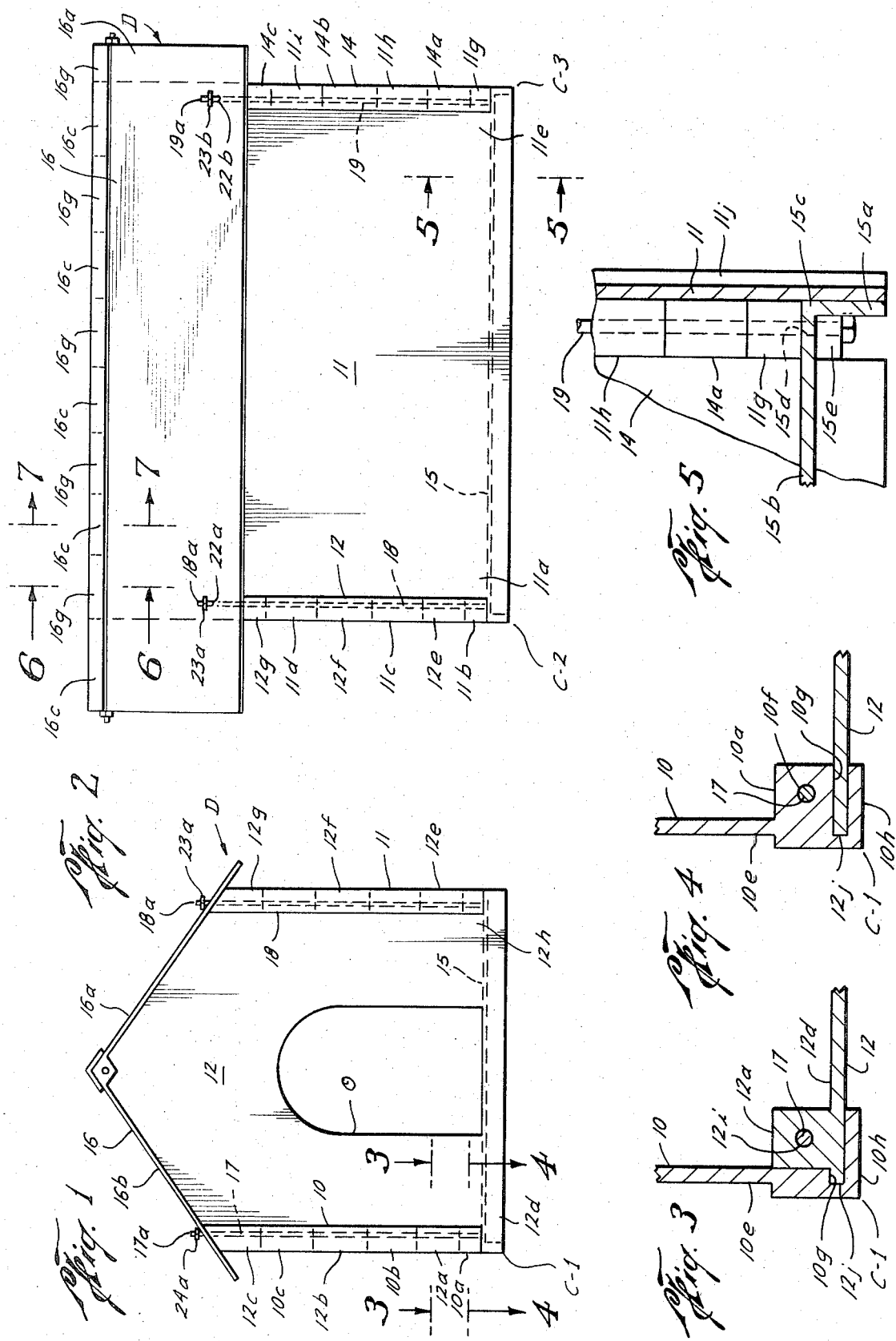

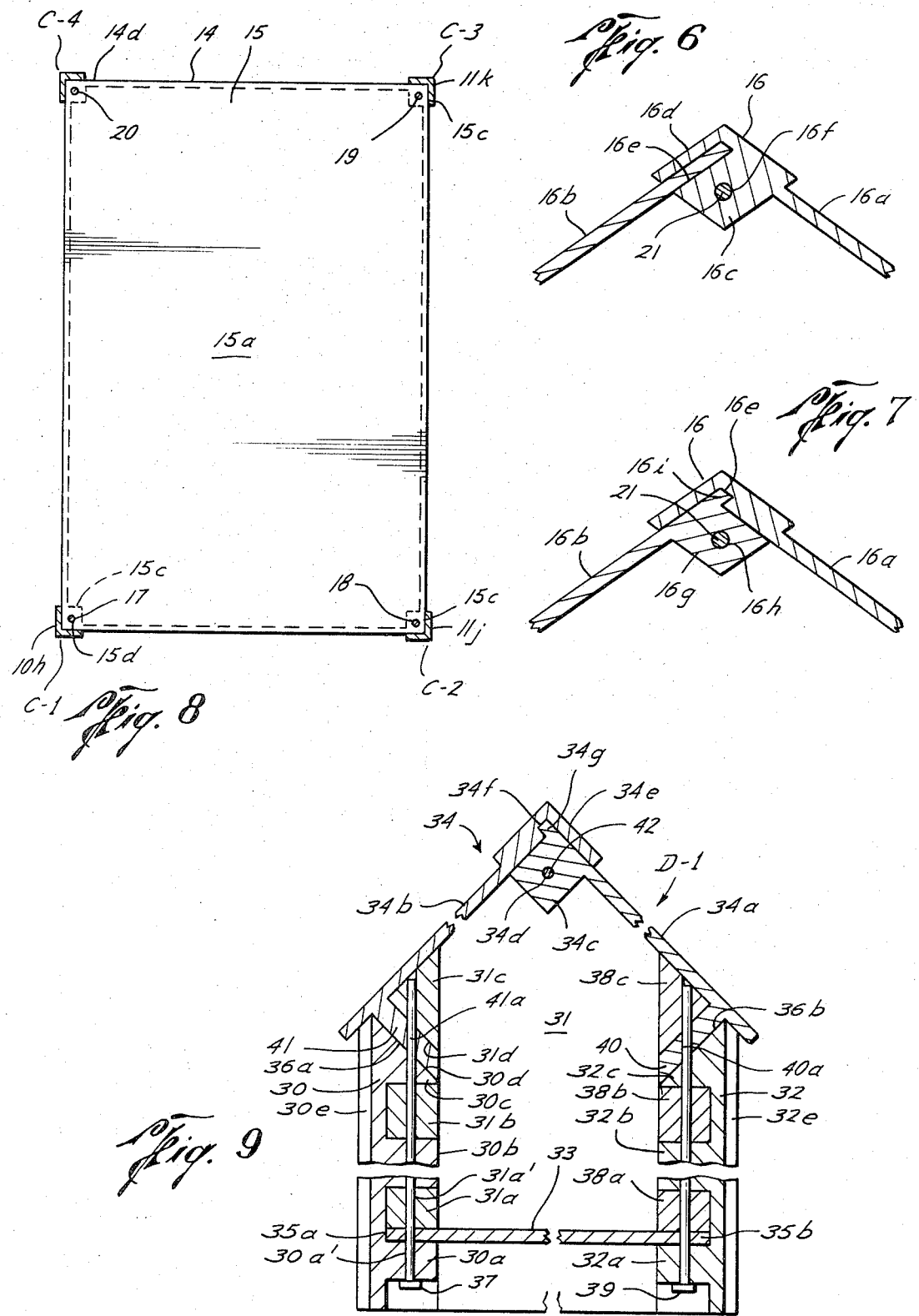

PREFABRICATED ANIMAL HOUSE

BACKGROUND OF THE INVENTION

The field of this invention is prefabricated animal enclosures.

Everyone is familiar with the traditional wooden dog house that has been constructed from the ground up board-by-board. The popularity of this type of dog house is limited by the time and difficulty involved in building the dog house and is further limited by the lack of mobility of the dog house once built. There are several patents which are directed to dog houses of a more prefabricated nature. U.S. Pat. No. 3,144,852 is directed to a portable-knock-down animal housing structure which consists of a series of panels held together by tie rods. The animal housing disclosed in U.S. Pat. No. 3,144,852 does not appear to be extremely sturdy, since its strength comes from a series of horizontally directed tie rods. U.S. Pat. No. 3,256,860 is directed to a prefabricated animal housing wherein the various panel members are joined by tongue and groove connections. While the animal enclosure disclosed therein may be classified as prefabricated, the use of the tongue and groove connections require close manufacturing tolerances which possibly increases manufacturing costs. Further, the tongue and groove connections may become worn and loose if the animal enclosure is disassembled and re-assembled several times.

SUMMARY OF THE INVENTION

It is an object of this invention to provide a new and improved prefabricated animal disclosure for dogs or the like utilizing synthetic, molded components which can be assembled and disassembled quickly and yet which provide a very sturdy animal enclosure when assembled.

The prefabricated animal house of the preferred embodiment of this invention includes first and second side wall having spaced corner lugs at the ends thereof. Front and rear walls are also provided with spaced lugs such that a four-wall enclosure may be provided by the interconnection of the lugs on the front and rear walls with the lugs on the first and second side walls. The lugs interconnect to provide corner support columns secured by pins which extend through aligned openings in the lugs. A floor is also secured by the pins and the pins further secure a gable roof onto the first and second side walls and the front and rear walls.

The gable roof is formed by interlocking roof panel lugs with a pin means. In one embodiment of this invention, the roof includes roof panels having lugs depending therefrom, the roof lugs extending into alignment with the corner lugs for the side, front and rear walls whereby the roof may be maintained in connection with the side walls and the front and rear walls by pin members which do not protrude through the roof.

BRIEF DESCRIPTION OF THE DRAWINGS

FIG. 1 is a front view of the animal enclosure of the preferred embodiment of this invention;

FIG. 2 is a side view of the animal enclosure;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 2;

FIG. 6 is a sectional view taken along line 6—6 of FIG. 6;

FIG. 7 is a sectional view taken along line 7—7 of FIG. 2;

FIG. 8 is a sectional view illustrating the connection of the floor for the animal enclosure of FIG. 1; and FIG. 9 is a front view end section of another embodiment of the animal enclosure.

DESCRIPTION OF THE PREFERRED EMBODIMENT

Referring to the drawings, the letter D generally designates a prefabricated animal enclosure or house for dogs or the like of the preferred embodiment of this invention. The prefabricated animal house D of the preferred embodiment of this invention includes a first side wall 10 and a second side wall 11, a front wall 12 and a rear wall 14. The animal house D further includes floor 15 and roof 16. The animal house D is designed such that the individual walls or panels may be prefabricated and assembled at the site of use easily and conveniently.

The first side wall 10 includes a plurality of spaced corner lugs or block portions 10a, 10b and 10c integrally formed at the front end 10e. The spaced lugs 10a, 10b, and 10c are substantially identical except for vertical spacing and therefore only the lug 10a will be described in detail. Referring to FIG. 4, the side wall front corner 10a is integrally formed with the first side wall 10 and has an opening 10f therein. The lug 10a further includes a vertical recess or groove adapted to receive front wall 12. The recess 10g serves to form an outer molding 10h which extends continuously throughout the height of the side wall end 10e.

The front wall 12 having door opening O therein includes a plurality of corner lugs 12a, 12b and 12c integrally formed at side 12d thereof and further includes lugs 12e, 12f and 12g integrally formed at side 12h thereof. All of the lugs 12a–12c and 12e–12g are vertically spaced along the ends 12d and 12h, respectively, and are integrally formed with the front wall 12. Since all of these front wall corner lugs are identical, only one of the front wall lugs will be described in detail. Referring to FIG. 3, the front wall lug 12a is integrally formed with the front wall 12 and has an opening 12i therein. The lug 12a further include a detent end portion 12j adapted to fit within the groove 10g. The lugs 12a–12c for the front wall 12 are vertically spaced to intermesh with the lugs 10a–10c for the front 10e of the side wall 10 such that the lug openings 12i and 10f are aligned. With the lugs intermeshed as illustrated in FIGS. 3 and 4, the detent end 12J of the front wall 12 fits within the recess groove 10g in the lugs such as 10a. Thus the vertical recess 10g serves to further support the interconnection of the side wall lugs 10a–10c and the front wall lugs 12a–12c and further to align lug openings 12i and 10f.

A locking pin 17 is inserted through the alinged lug openings 10f and 12i in order to interconnect the front end 10e of the first side wall 10 and the end 12d of the front wall 12. The exact connection of the locking pin 17 will be described hereinafter. For the purposes of definition, the lugs 10a–10c on the side wall 10 and the lug 12a–12c on the front wall 12, together with the locking pin 17, cooperate to form a stacked, continuous column corner C-1 for the animal house D.

The second side wall 11 includes at its front end 11a corner lugs 11b, 11c and 11d and further includes at its rear end 11e lugs 11g, 11h and 11i. The lugs 11b–11d at the front end 11a of the second side wall 11 cooperate with the integrally formed lugs 12e–12g on front wall end 12h to provide corner C-2 for the animal house D. The corner C-2 is formed similarly to the corner C-1. The lugs 12e–12g on the front wall 12 mesh with the lugs 11b–11d at the front end 11a of the second side wall 11 such that the openings therein (similar to the openings 10i and 10f in FIGS. 3 and 4) are aligned to receive a lock pin 18. Thus, the corner C-2 is formed identically to the corner C-1. The second side wall 11 includes a front exterior facing or molding 11j and a rear exterior facing or molding 11k.

The rear wall 14 also includes vertically spaced integrally formed lugs 14a–14c which are vertically positioned to mesh with the vertically spaced side wall lugs 11g–11i in order to form animal house corner C-3. A locking pin 19 extends through aligned openings in the lugs whereby a very solid column corner C-3 is provided.

The final corner herewith designated as C-4 is provided by the interconnection of integrally formed lugs at the rear of the first side wall 10 and at the remaining, end 14d of the rear wall 14. These lugs (not shown) at the rear end of first side wall 10 and at the end of the rear wall 14 are locked in a meshed interconnection by means of lock pin 20 (FIG. 4).

Referring again to the corner C-1 formed by the alternatively spaced lugs 10a–10c of first side wall 10 and alternatively spaced lugs 12a–12c of the front wall 12, it is noted that the lugs such as 10a and 12a are spaced such that they interconnect or stack to form a continuous column extending from the bottom lug 10a to the very top lug 12c. The lock pin 17 inserted through the openings 10f and 12i secure the lugs in this interconnectd, column formation.

Referring to FIGS. 1, 2, 5 and 8, the floor 15 includes a downwardly extending rim 15a which is integrally formed with the flat, horizontal portion 15b of the floor. The floor 15 is of sufficient size so as to include corner portions 15c which extend underneath the bottom lugs C-1 and C-4. For example, referring to the corner C-1, the floor corner 15c extends under the bottom side wall lug 10a. And, each of the floor corners 15c has an opening 15d therein. The openings 15d are designed to be aligned with the aligned lug openings at the corners C-1 through C-4. For example, referring to FIGS. 3 and 4 and the corner C-1 illustrated there, the opening 15d at the floor corner 15c is positioned to be aligned with the lug openings 10f and 12i such that the locking pin 17 may be extended through all the openings thereby securing the floor with the first and second side walls 10 and 11 and the front wall 12 and the rear wall 14.

For further illustration, let us refer to FIG. 5 wherein corner C-3 is illustrated in greater detail. The corner 15c of the floor portion 15b is positioned directly under the second side wall bottom lug 11g such that opening 15d in the floor corner is aligned with openings in the side wall lugs 11g–11i and the rear wall lugs 14a–14c, such that the lock pin 19 can be driven through the opening 15d and the openings in the lugs for the side wall and rear wall thereby securing the floor 15 with the side wall and rear wall. The floor corner openings 15d may include a spacer portion 15e (integrally formed with the floor) extending from under the floor portion 15b in order to provide greater strength at the mounting point of the lock pins such as the pin 19. The head of the lock pin 19 is thus positioned against the spacer 15e and extends upwardly through the corner opening 15d and the openings in the lugs forming the corner C-3. Similar spacers 15e are provided for each of the corners 15c of the floor 15.

The roof 16 is a gable roof formed by a first roof member 16a and a second roof member 16b.

the first roof member 16a includes alternatively spaced lugs 16c. The alternately spaced lugs 16c include an outer molding or facing 16d and a mounting recess 16e. An opening 16f extends through each of the lugs 16c. Similarly, the roof member 16b includes spaced lugs 16g having openings 16h therein. A detent portion 16i, which is the upper edge of the roof member 16b, is adapted for placement within the groove 16e. Thus, the first and second roof members are mounted in a gable configuration such that the lugs 16g are meshed with the lugs 16c and the lug openings 16f and 16h are aligned to receive lock pin or bolt 21.

It is noted that the lug recess 16e for the roof member 16a is much deeper in the areas where there is a lug 16c. This is because, in the corresponding area on the roof member 16b, there is no lug and the roof end portion is simply a flat end portion which is adapted to be placed within the lug groove 16e for the roof member 16a. In this manner, the roof members 16a and 16b are interconnected and a pin 21 is mounted through the aligned openings 16f and 16h in order to lock the roof members together in the gable roof formation. The outer molding or facing 16d covers the interlocking lugs thereby preventing leakage and providing a smooth, pleasing exterior at the point of connection between the roof members.

The roof member 16a has two openings 22a and 22b therein in position to receive upper lock pin ends 18a 19a. These upper end portions 18a and 19a of the lock pins 18 and 19, respectively, are threaded such that nuts 23a and 23b may be mounted thereon to secure the roof members 16a to the lock pins. A rubber washer or other seal or grommet may be provided between the bolts 23a and 23b and the roof member 16a in order to prevent leakage of water into the animal housing D.

The roof member 16b also has openings in order to receive upper threaded portions such as 17a of the lock pins 17 and 20. The roof member 16b is bolted onto threaded upper portions of the lock rods or pins 17 and 20 by bolts such as 24a. Thus the roof member 16b is mounted with the side walls 10 and 11, the front wall 12, and the rear wall 14 and the floor 15 in order to provide a completely enclosed animal house D.

The prefabricated animal house D may be made of molded polymer or other suitable material such that the individual walls or members can be easily and economically manufactured. The animal house D can be assembled any place such as in the back yard of the dog or other animal owner. First the floor 15 is placed onto the ground. Then, the corner C-1 is formed by interconnecting the front wall 12 and the first side wall 10 such that the lug openings such as 10f and 12i are aligned. The lock rod or pin 17 is then driven through the floor opening 15d and the aligned openings such as 10f and 12i in the lugs 10a 12a in order to secure the corner C-1. The same procedure is followed with the rear wall 14 and the first side wall 10 in order to provide the corner C–4 which is secured by lock rod or pin 20.

The second side wall 11 is then interconnected with the front and rear walls 12 and 14 such that the lugs mounted thereon are intermeshed to form the corners C–2 and C–3. The lock pins 18 and 19 are driven through the floor openings 15d and upwardly through the aligned lug openings at these corners in order to secure the side wall 11 to the front wall 12 and the rear wall 14. The roof membdrs 16a and 16b are then interconnected such that the spaced lugs 16c and 16g are meshed to receive the roof lock rod or pin 21.

The roof is then mounted onto the side walls 10 and 11, the front was 12 and rear wall 14 such that the lock rods 17–20 extend through the openings such as 22a and 22b in the roof members 16a and 16b. Nuts are then mounted onto the upper threaded end portions of the lock pins. For example, the nut 23a is screwed onto the upper lock pin portion 18a in order to secure the corner C–2. A rubber grommet may be positioned between the roof member 16a and the bolt 23a in order to prevent leakage.

The completed animal house D is very strong and sturdy, and may be assembled quickly and easily without the use of any special tools or equipment. It is noted that the exterior appearance of the animal house D is quite finished in appearance due to the outer facings or molds such as 10h provided by the side wall 10. These molds provide a very smooth corner molding which not only provides a very pleasing exterior but also serves to seal the corners against leakage between the individual lugs forming the corner.

In an alternate embodiment of this invention, the animal house D–1 of FIG. 9 is provided. Since the concept involved in the animal house D–1 is quite similar to that involved in the animal house D, only a portion of the animal house D–1 need be illustrated. A first side wall 30, a rear wall 31, a second side wall 32, a floor 33 and a roof member 34 are illustrated. The front wall for the enclosure D–1 is not shown since its construction is obvious in view of the description herein.

The side wall 30 includes a plurality of spaced lugs such as 30a, 30b and 30c. However, in this embodiment, the top spaced lug 30c is formed with an upper, sloped surface 30d.

The rear wall 31 also includes a plurality of spaced lugs at both ends thereof. At the left end of the rear wall 31, a bottom lug 31a is provided for meshing with the side wall lugs 30a and 30b. The bottom rear wall lug 31a cooperates with the bottom side wall lug 30a to provide a horizontal recess 35a to receive a corner of the floor 33. The rear wall 31 includes intermediate lugs such as 31b and a top lug 31c. The top lug 31c includes a sloped bottom surface 31d spaced from the sloped top lug surface 30d of side wall 30 to provide a sloped recess 36a.

The rear wall 31 forms a corner with the side wall 30 by the interconnecting of the lugs such as 30a and 31a such that lug openings 30a' and 31a' are aligned to receive the lock pin 37. The lock pin 37 extends through lug openings in the lugs 30a–30c and 31a–31c in order to secure the corner connection between the rear wall 31 and the side wall 30. The side wall 32 is provided with lugs 32a, 32b and a top lug 32c. The rear wall is further provided with lugs 38a, 38b and top rear wall lug 38c on right end thereof.

The lugs 32a and 38a cooperate to provide a horizontal recess 35e to receive another corner of the floor 33. The top lugs 38c and 32c cooperate to provide a sloped recess 36b. A lock pin 39 is driven through openings in the lugs such as 38a and 32b in order to secure the lugs in corner column of support and connection. Before leaving this discussion of the interconnection of the rear wall 31 with the side walls 30 and 32, it is noted that the side wall 30 includes an outer facing or molding 30e and the side wall 32 includes an outer facing or molding 32e. Although the front wall for the animal housing D–1 is not illustrated, it should be understood that interconnected lug and lock pin arrangements are used to provide a strong, sturdy corner connections between the front wall and both the side walls 30 and 32.

The gable roof assembly 34 includes roof members 34a and 34b. The roof member 34a includes spaced lugs 34c having openings 34d therein. The roof member 34b also includes spaced lugs (not shown) and further includes an outer molding or facing 34e and a mounting groove 34f. The mounting groove 34f in the roof member 34b is adapted to receive the end portion or edge 34g of the roof member 34a. The spaced lugs for the roof member 34b are alinged with the spaced lugs 34c for the roof member 34a such that a roof lock pin 40 may be driven through lug openings such as 34d in order to secure the roof means 34 in the gable configuration.

The roof assembly 34 of the alternate embodiment D–1 is attached to the remainder of the animal house in a different manner than the attachment of the roof 16 to the rest of the house D. The roof member 34a includes a depending lug or connecting member 40 integrally formed therewith. The depending lug 40 is positioned to extend into the sloped recess 36b formed between the spaced top lugs 38c of the rear wall 31 and 32c of the side wall 32. The depending lug 40 has an opening 40a therein which is adapted for alignment with the openings in the other lugs forming that corner such that the lock rod 39 may be driven therethrough to secure the roof member 34 with the lugs.

Similarly, the roof member 34b includes depending lug 41 integrally formed therewith. The depending lug 41 is sloped at an angle equal to the angle of the sloped recess 36a such that the depending lug 41 may be inserted therein in order to secure roof member 34b. The depending, sloped lug or connecting member 41 includes opening 41a which is aligned with the openings in the lugs 30a–30c for side wall 30 and the lugs 31a–31c for rear wall 31. In this manner, the lock rod 37 may be used to secure not only the side wall 30 and rear wall 31 lugs in a meshed interconnection, but also may be used to secure the roof member 34b therewith. One of the significant advantages of the animal house D–1 is that the roof members 34a and 34b need not have any holes therein in order to assure a leak proof roof. The roof members 34a and 34b further include depending lugs such as 40 and 41 which are positioned to fit in sloped recesses formed between the front wall (not shown) and side walls 30 and 32.

The animal house D–1 is assembled in the following manner. First of all, the various parts or members of the animal house D–1 may be formed of any suitable polymer such as a polymeric foam by molding or other means. The actual house D–1 itself can be assembled at any location with a minimal use of extra tools or equipment. First the side wall 30 is connected with the front wall (not shown) and the rear wall 31 by the utilization of interconnecting lugs. Then the floor 33 is mounted into the recesses such as the horizontal recess 35a between lugs 31a and 30a. Of course, the floor 33 has openings at the corners thereof in order to receive the lock pins, too. The remaining side wall 32 is then positioned and mounted with the front and rear walls and floor 33.

The roof member 34a is then mounted onto the top of the side wall 32, the rear wall 31 and the front wall such that the depending lugs such as 40 are positioned within the slanted lug recesses such as 36b. Drive pins such as 39 are then driven through all the lugs in the columns formed in order to secure these two corners and the roof member 34a together.

The roof member 34b is then interconnected with the roof member 34a and is secured by means of the lock pin 42. In this position, the depending lugs such as 41 are positioned between top lugs such as 31c and 30c in recess 36a and lock pins such as 37 are driven between all the lugs within a column such as illustrated in FiG. 9 in order to secure the corners together. In this manner, a complete, leak-proof modular animal house D-1 is provided which is not only very sturdy, but also very easy to assemble.

The foregoing disclosure and description of the invention are illustrative and explanatory thereof, and various changes in the size, shape, and materials as well as in the details of the illustrated construction may be made without departing from the spirit of the invention.

I claim:

1. A prefabricated animal enclosure for dogs or the like, comprising:
   first and second side walls having spaced lugs at the ends thereof, said first and second wall lugs having openings therein;
   front and rear walls having spaced lugs at the ends thereof, said front and rear wall lugs having openings therein;
   said first and second side walls being mountable with said front and rear walls such that said openings in said first and second side walls lugs align with openings in said front and rear wall lugs;
   a floor for mounting with said first and second side walls and with said front and rear walls; and
   pin means for locking said first and second side wall lugs with said front and rear wall lugs and for locking said side, front and rear walls with said floor and said roof means; and
   said side walls having exterior moldings integrally formed therewith to cover said aligned lugs at the corners of said animal enclosure.

2. The structure set forth in claim 1, including:
   said first and second side wall lugs being meshed with said front and rear wall lugs to form substantially continuous corners between said first and second side walls and said front and rear walls.

3. The structure set forth in claim 1, including:
   said side walls including substantially vertical grooves for receiving edges of said front and rear wall members.

4. The structure set forth in claim 1, wherein said pin means includes:
   corner pins extending through said aligned lug openings for locking said first and second side walls with said front and rear walls.

5. The structure set forth in claim 4, including:
   said corner pins extending through said roof means for securing said roof means onto said fornt, rear walls and said first and second side walls.

6. The structure set forth in claim 1, including:
   said floor having openings therein that align with said lug openings in said first and second side walls and said front and rear walls; and
   said pins means including corner pins which extend through said openings in said floor and said lugs to interconnect same.

7. The structure set forth in claim 6, including:
   said floor being positioned between said first and second side wall lugs and said front and rear wall lugs.

8. The structure set forth in claim 1, including:
   said roof means including first and second roof members having spaced lugs, with openings therein which are positioned for alignment with said roof members interconnected; and
   a roof pin extending through said openings in said roof member lugs.

9. A prefabricated animal enclosure for dogs or the like, comprising;
   first and second side walls having spaced lugs at the ends thereof, said first and second side wall lugs having openings therein;
   front and rear walls having spaced lugs at the ends thereof, said front and rear wall lugs having openings therein;
   said first and second side walls being mountable with said front and rear walls such that said openings in said first and second side wall lugs align with openings in said front and rear wall lugs;
   a floor for mounting with said first and second side walls and with said front and rear walls;
   roof means for mounting on said first and second side walls and said front and rear walls; and
   pin means for locking said first and second side wall lugs with said front and rear wall lugs and for locking said side, front and rear walls with said floor and said roof means; and
   said roof means including a roof member; and
   said roof member having corner lugs which fit between said first and second side wall lugs and said front and rear wall lugs whereby said roof member receives said pin means internally of the roof.

10. The structure set forth in claim 9, including:
    said roof lugs having openings therein that are aligned with said openings in said first and second side wall lugs and said openings in said front and rear wall lugs.

11. The structure set forth in claim 10, wherein said pin means includes;
    lock pins extending through aligned openings in said lugs for said first and second side walls, said lugs for said front and rear walls and said roof corner lugs.

12. The structure set forth in claim 9, including:
    said lugs for said first and second side walls being sufficiently spaced from said lugs of said front and rear walls for receiving said roof corner lugs.

* * * * *